Figure 1:
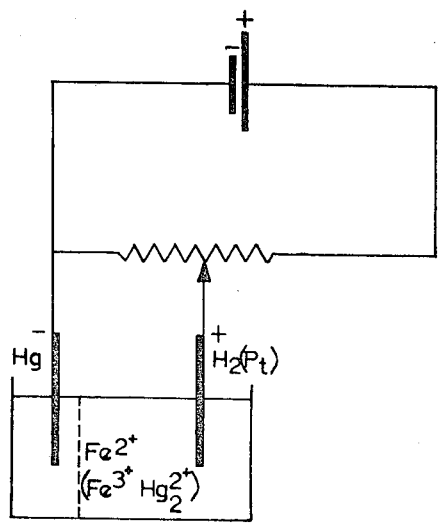

United States Patent

[11] 3,616,327

| [72] | Inventors | Embrecht Barendrecht;<br>John W. Geus, both of Geleen, Netherlands |
|---|---|---|
| [21] | Appl. No. | 875,072 |
| [22] | Filed | Nov. 10, 1969 |
| [45] | Patented | Oct. 26, 1971 |
| [73] | Assignee | Stamicarbon N.V.<br>Heerlen, Netherlands |
| [32] | Priority | Nov. 8, 1968 |
| [33] | | Netherlands |
| [31] | | 6815906 |

[54] PREPARING FERROUS SALT SOLUTIONS
4 Claims, 3 Drawing Figs.

[52] U.S. Cl. .................................................... 204/94,
23/87 R, 204/93
[51] Int. Cl. .................................................. C01g 49/10,
B01k 1/00
[50] Field of Search .......................................... 204/86, 94,
93; 23/87 R, 126

[56] References Cited
UNITED STATES PATENTS

| 2,374,453 | 4/1945 | Oliver et al. ................. | 23/87 R |
| 2,719,074 | 9/1955 | Brace .......................... | 23/87 R |
| 3,390,064 | 6/1968 | Babtakmens et al. .......... | 204/94 |

OTHER REFERENCES
Titanium by Barksdale 2nd Ed., pp. 245, 246 pub. by Ronald Press Co., New York 1966 Copy in Sci. Lib.

*Primary Examiner*—F. C. Edmundson
*Attorney*—Cushman, Darby & Cushman

ABSTRACT: Ferrous salt solutions are produced by contacting an aqueous iron salt solution in a reaction vessel with two electrodes, one of which consisting of a layer of mercury and the other of a hydrogen electrode, consisting of a noble-metal conductor along and around which a stream of hydrogen is passed, the two electrodes being connected by means of an electric conductor.

PREPARING FERROUS SALT SOLUTIONS

The invention relates to a process for the electrochemical preparation of ferrous salt solutions, and to a device for preparing and preserving a ferrous salt solution.

In a number of technically important cases one must have the disposal of a bivalent iron solution which is completely free of trivalent iron. This need exists for example in the preparation of iron catalysts according to the U.S. Pat. application Ser. No. 721,051, filed Apr. 12, 1968, now abandoned, or in the preparation of ferromagnetic materials according to the U.S. Pat. application Ser. No. 743,000, filed July 8, 1968, now abandoned. In the above-mentioned cases ferrous hydroxyde, or ferrous carbonate are precipitated on a support, or coprecipitated with another metal hydroxide. The presence of small amounts of ferric ions in the starting solutions normally has an adverse effect on the precipitation process.

In industry ferrous salts are usually made by dissolving metallic iron in a mineral acid. These solutions are always contaminated with ferric ions. The cause of this is to be sought in the oxidation of the bivalent iron by atmospheric oxygen at the surface of the solution, or by oxygen dissolved in the solution. The hydrogen released during dissolution of the iron is not capable of reducing the trivalent iron again; even if an excess of iron is treated with a mineral acid, contamination with trivalent iron cannot be prevented.

It is well known that ferric ions react with metallic mercury according to the reaction:

$$2\ Fe^{3+} + 2\ Hg \rightarrow 2\ Fe^{2+} + Hg_2^{2+}$$

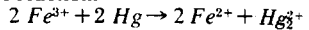

It is possible in this manner to prepare e.g. ferric-free ferrous chloride; for, the $Hg_2Cl_2$ is insoluble and may therefore be removed by decantation or filtration. The process is less suited, however, for application on an industrial scale. In the first place the $Hg_2Cl_2$ formed is difficult to recover. Further, the mercury does not react completely because it gets isolated by a layer of mercurous chloride. If much mercurous chloride (calomel) has already been formed, isolation of the metallic mercury cannot be prevented even by violent shaking. As a consequence, relatively much fresh mercury has to be supplied. Finally, if much calomel is present, preservation of a ferric-free salt solution is difficult to realize owing to the above-mentioned passivation of the metallic mercury.

It has now been found that the preparation and preservation of a ferrous salt solution can be realized with very great simplicity by using a combination of chemical and electrochemical reactions that are known in the art. In addition, the process and device according to the invention are particularly suited for application on an industrial scale. According to the present invention the iron salt solution is brought into contact in a reaction vessel with two electrodes, one of which consists of a layer of mercury and the other of a noble-metal conductor along and around which a stream of hydrogen gas is passed, the said two electrodes being connected electricity conductive. Platinum, and especially the more active platinized platinum is preferred for the noble-metal. With the hydrogen gas being passed along and around the noble-metal electrode, the second electrode in fact acts as a hydrogen electrode.

In the case considered here the above-mentioned reaction $$2Fe^{3+} + 2Hg \rightleftharpoons 2Fe^{2+} Hg_2^{2+}$$

proceeds in combination with the two electrochemical reactions at the hydrogen electrode:

$$Hg_2^{2+} + 2e \rightleftharpoons 2Hg$$
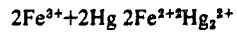
and $H_2 \rightleftharpoons 2H^+ + 2e$
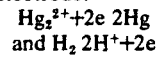

An important advantage of this combination of reactions is that no contaminating ions are brought into the solution; the solubility of metallic mercury is extremely low, while the hydrogen ions formed do not contaminate the solution. By choosing a reaction vessel of an appropriate design the hydrogen gas passed along the noble-metal electrode can also be used as a shield gas for preventing intermediary oxidation by atmospheric oxygen. To ensure proper operation, the iron salt solution should be agitated, at least in the immediate vicinity of the mercury electrode.

It should be stated that the practice of transforming ferric salt solutions into ferrous salt solutions, e.g. potassium ferrocyanide into potassium ferric cyanide, is well known in the art. Undesired side reactions, such as generation of oxygen, render this process unfit for preserving a converted compound.

The basic diagram of the circuit used in the process and installation according to the invention is illustrated in FIG. 1.

Figure 2:
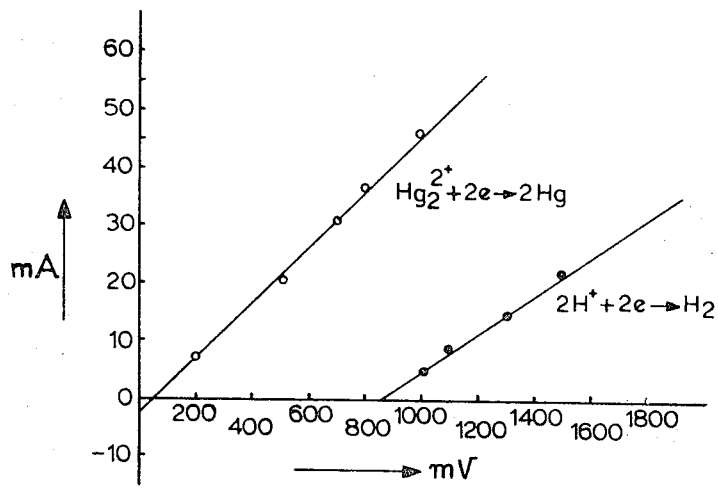

A A platinum-hydrogen electrode and a mercury electrode are placed in an iron chloride solution to be purified. The hydrogen electrode is connected with the positive pole, and the mercury electrode with the negative pole of a voltage source. FIG. 2 shows the current-voltage characteristic for such a cell. As long as ferric ions are present in the solution, they will rapidly react with the metallic mercury; the calomel thus forming on the mercury electrode is immediately reduced again to mercury. Since the platinized hydrogen electrode gets poisoned in a relatively short time, the hydrogen at the electrode has a slight surplus voltage. In consequence a low voltage suffices for suppressing the backward reaction (calomel formation). FIG. 2 also shows a current-voltage characteristic measured in the absence of ferric ions. As soon as all ferric ions have been removed from the solution, the reaction $$2H^+ + 2e \rightarrow H_2$$

will proceed at the mercury surface.

However, as the hydrogen at the mercury surfaces has a considerable surplus voltage, a higher voltage is needed for making the reaction proceed. This has the advantage that at a voltage of, say, 400 mv. only the trivalent iron in the solution is converted, without evolution of hydrogen.

The invention also relates to an installation for preparing and preserving a ferrous salt solution. Said installation comprises a vessel for an iron salt solution; a primary electrode, consisting of a layer of mercury, and a secondary electrode, consisting of a noble-metal conductor; a feed line for hydrogen gas; means for enabling said hydrogen gas to flow in finely divided state through the solution along and around the noble-metal electrode and subsequently to fill the remaining volume of the vessel; and an electric conductor connecting the two electrodes.

Figure 3:
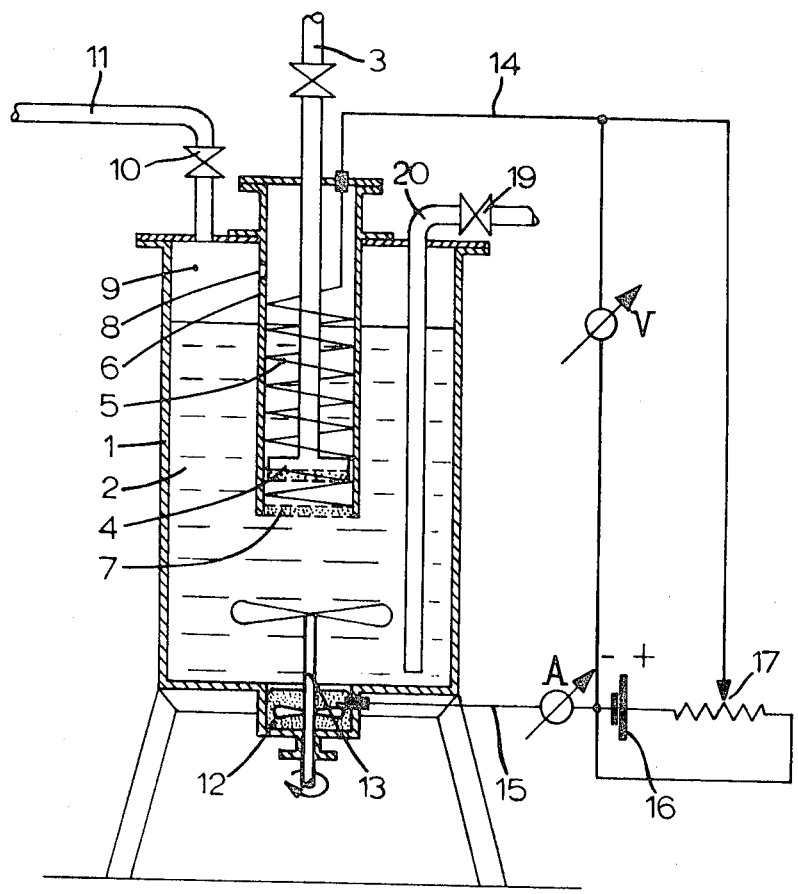

FIG. 3 shows a diagram of an installation based on the principle of the invention. A reaction vessel 1, built for example of ebonited steel, contains an iron salt solution 2. Hydrogen gas is supplied along line 3, and, via a sieve plate 4, disposed at the end of line 3, passed in a finely divided state along and around an isolated platinum electrode 5 through the solution. The latter electrode is contained in a guide tube 6 which is provided with a coarse sieve plate 7 to ensure direct contact with the liquid in the vessel. The hydrogen gas issues from guide tube 6 through an aperture 8 to shield solution 2 in space 9. Finally, the gas is discharged via a cock 10, which may be designed as a pressure-relief valve, if so desired, and line 11. Mercury electrode 12 is disposed in a depression in the bottom of vessel 1. To effect a slight agitation of the mercury layer and/or the iron salt solution, an agitator 13 is mounted in the bottom of the vessel. Platinum electrode 5 and the mercury electrode 12 may be electrically connected, either directly, e.g. by means of the lines 14 and 15, or via the wall of the vessel. Preferably, a direct voltage source 16, whether or not controlled by a potentiometer 17, is installed between the lines 14 and 15 in the way shown in the figure. To discharge the ready ferrous solution, cock 10 is closed, while the feed of hydrogen through line 3 is continued. This increases the excess pressure in space 9, after which the required volume of solution can be drawn off by opening cock 19 in line 20. Fresh solution may then be admitted through the same line.

Although the process may be started with a fully trivalent solution, it will normally be simpler to fill the vessel with a solution which has been prepared by dissolving metallic iron in, e.g. hydrochloric acid and, in consequence, is already largely bivalent. In general, the process and installation according to the invention may be employed for preparing and preserving iron salt solutions of hydrochloric acid, sulphuric acid, acetic acid or other acids in which the iron readily dissolves. The process and the installation according to the invention are suited for laboratory and, after upscaling, can also be employed on an industrial scale.

What is claimed is:

1. A process for the electrochemical preparation of ferrous ion solutions substantially free from ferric ions which comprises bringing an iron salt solution containing at least some ferric ions into contact with a first electrode having a layer of mercury metal and a second noble-metal electrode along and around which a stream of hydrogen is passed, imposing a positive voltage on said second noble-metal electrode and a relatively negative voltage on said first mercury electrode, and maintaining a sufficient potential difference of at most about 1 volt, between said electrodes for sufficient time to effect reduction of said ferric ions to ferrous ions.

2. The process according to claim 1 wherein, said noble-metal electrode is a platinum electrode.

3. The process according to claim 2 wherein said platinum electrode is a platinized platinum electrode.

4. The process according to claim 1 wherein said iron salt solution is agitated in at least the said vicinity of said first electrode.

* * * * *